United States Patent [19]

Kuehl

[11] Patent Number: 4,973,293
[45] Date of Patent: Nov. 27, 1990

[54] MULTIPLE DRIVE CHAIN SYSTEM
[75] Inventor: Guenther L. Kuehl, Greenwich, Conn.
[73] Assignee: Z-Loda Systems Engineering, Inc., Stamford, Conn.
[21] Appl. No.: 418,244
[22] Filed: Oct. 6, 1989
[51] Int. Cl.⁵ .................. F16G 13/02; B65G 15/52
[52] U.S. Cl. ............................. 474/212; 198/799; 474/85; 474/153
[58] Field of Search ................ 474/84–89, 474/212–217, 206, 152, 153; 198/799, 797, 793

[56] References Cited
U.S. PATENT DOCUMENTS 3,583,550  6/1971  Gardiner, Jr. ............... 198/799
3,756,378  9/1973  Kuehl et al. ................ 198/799

Primary Examiner—Thuy M. Bui

[57] ABSTRACT

A multiple drive chain system comprises two-chain pairs and a plurality of rotatable sprockets working together and with the chain pairs to lift and transport heavy loads. The two-chain pairs are arranged in superposed interlocking relationship and each chain is made of a succession of links having link plates wherein the link plates of the fourth chain lie between and are inner to the link plates of the third chain, and the link plates of the first plate lie between and are inner to the link plates of the second chain. The first and third chains are piggybacked for part of their travel and, similarly, the second and fourth chains are piggybacked through part of their travel.

6 Claims, 3 Drawing Sheets

MULTIPLE DRIVE CHAIN SYSTEM

FIELD OF THE INVENTION

This invention relates generally to drive chain systems and, in particular, to an improved multiple drive chain system for transporting large and heavy loads.

BACKGROUND OF THE INVENTION

In U.S. Pat. No. 3,583,550, issued on June 8, 1971, and assigned to the assignee of the present application, there is described a drive chain for transporting loads and the like. The drive chain described in that patent comprises at least two chains arranged in superposed interlocking relationship, with each chain having a succession of links with overlapping portions which are connected together by coupling members or pins. The drive chain therein described constituted an improvement over the drive chains which theretofore had been used for transporting loads and the like. For example, as disclosed in that patent, in the prior art transport devices including drive chain systems, each chain or chain pair has exclusively associated therewith guide and drive members. Frequently, space and equipment limitations limit the number of chains that can be employed. Moreover, the load-carrying capabilities of such drive chains are limited. Since, generally, the load is carried by the pin members of the chains which connect the links of the chain together, and these pin members have limited shear strengths, care must be taken to avoid shearing the pins due to overloads.

Although the drive chain described in the aforementioned patent affords some improvements, it nevertheless has limited load-carrying capability.

Accordingly, it is an object of the present invention to provide an improved drive chain which is capable of transporting larger and heavier loads than the prior devices, including the drive chain described in the aforementioned patent.

It is a further object of the present invention to provide a drive chain wherein two pairs of chains share one sprocket during their travel, one pair running inside, and the other pair running outside the inner pair.

It is still another object of the present invention to provide a drive chain system comprising a plurality of chains and sprocket means cooperating to maximize the load-carrying capability of the system.

SUMMARY OF THE INVENTION

A drive chain system is provided for transporting and lifting large and heavy loads. The system comprises at least two chain pairs consisting of first, second, third and fourth chains which are arranged in superposed, interlocking relationship throughout at least a part of their travel. Each chain is made of a succession of links with overlapping portions rotatably connected to each other, with each link having opposed and spaced-apart link plates wherein the link plates of the fourth chain lie between and are inner to the link plates of third chain. Similarly, the link plates of the first chain lie between and are inner to the link plates of the second chain. The first and third chains are piggybacked for part of their travel and the second and fourth chains are also piggybacked for part of their travel. The system also comprises a plurality of rotatably-driven sprockets which cooperate with the chains to lift and transport the loads.

BRIEF DESCRIPTION OF THE DRAWINGS

In the drawings, wherein like reference numerals designate like parts.

DETAILED DESCRIPTION OF THE INVENTION

Figure 1A:
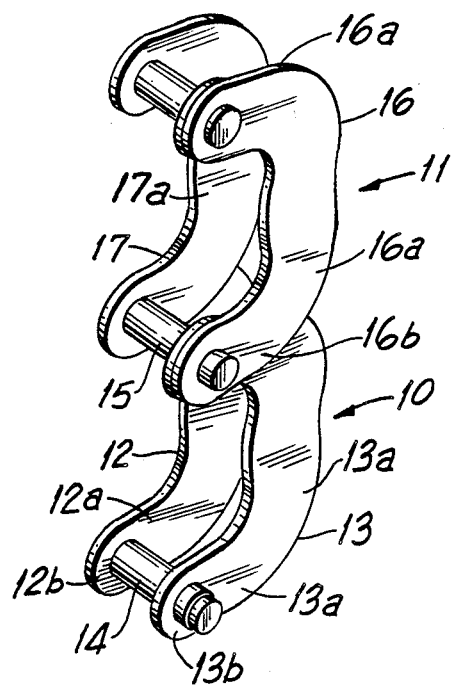
FIG. 1A is an enlarged perspective view illustrating two successive links in the succession of links which form a chain of the drive chain shown in FIG. 1.
Figure 1:
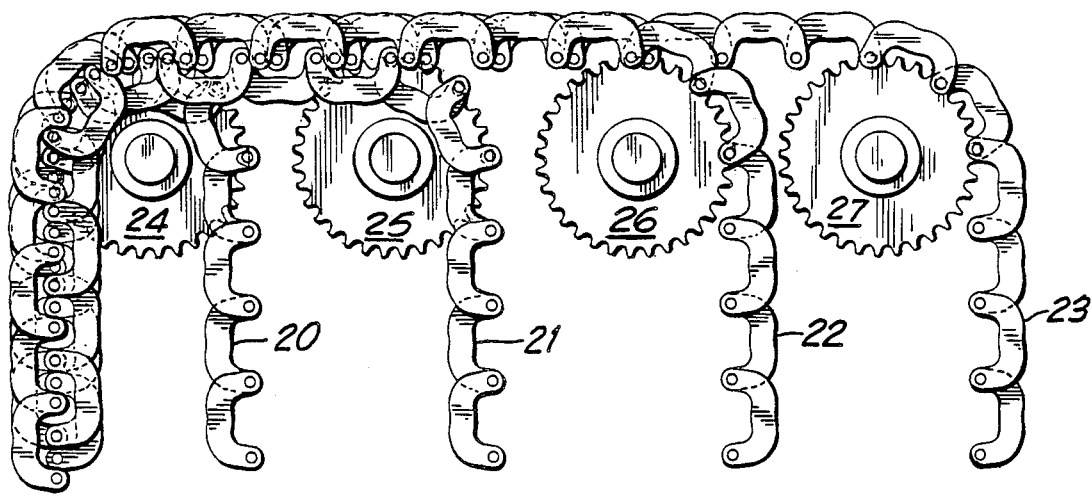
FIG. 1 is a side view of a typical drive chain system arranged according to the present invention.
Figure 2:
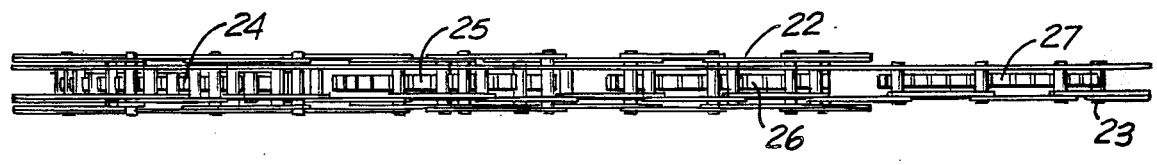
FIG. 2 is a top plan view of the drive chain system shown in FIG. 1.

Referring to the drawings and first to FIGS. 1-4, there is shown in FIG. 1 four chains 20, 21, 22 and 23, with each chain being formed of a succession of links such as the links 10 and 11 shown in FIG. 1A. The link 10 is formed of opposed, spaced apart, and generally parallel link plates 12, 13 and the link 11 is similarly formed of opposed, spaced apart and generally parallel link plates 16, 17. Each of the link plates 12, 13, 16 and 17 has a generally U-shaped configuration and is defined by a central body plate portions 12a, 13a, 16a and 17a and opposed raised end or arm portions 12b, 13b, 16b and 17b. The links 10, 11 are rotatably connected together by the pin members 14, 15 which act to pivot the links and to maintain the link plates spaced apart at a fixed and substantially parallel distance during the travel of the chains.

Figure 3:
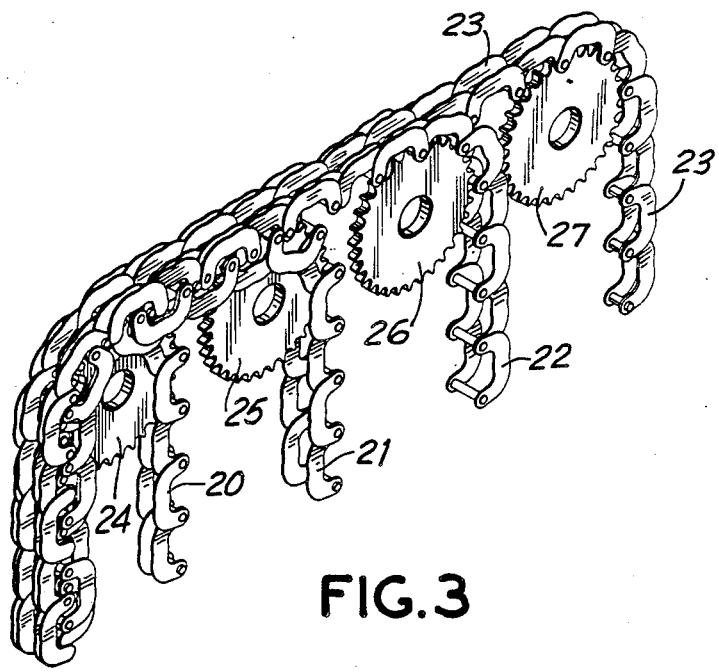
FIG. 3 is a partial perspective view of the drive chain system illustrated in FIG. 1.
Figure 4:
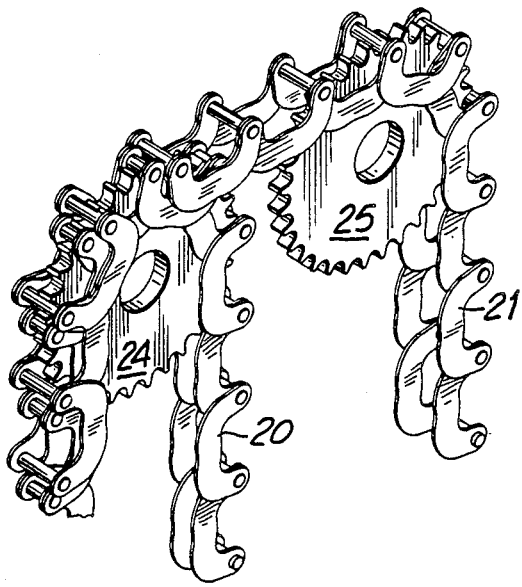
FIG. 4 is an enlarged perspective view of a portion of the drive chain system of FIG. 1.

Referring again to FIGS. 1-4, the chains 20, 21, 22 and 23 are trained over the rotatable sprockets 24, 25, 26 and 27 as shown more clearly in FIGS. 1 and 3. Thus, the sprocket 24 drives the chains 20, 21, 22 and 23 in interlocking relationship; the sprocket 25 drives the chains 21, 22 and 23 in interlocking relationship; the sprocket 26 drives the chains 22 and 23 in interlocking relationship, and the sprocket 27 drives the chain 23. As is also shown in FIGS. 1 and 3, the chain 20 is inner relative to the bottom of outer chain 21 and chain 23 is inner relative to the bottom outer chain 22. The links of the inner chains 20 and 23 are piggybacked to each other and the links of the outer chains 21 and 22 are also piggybacked to each other during part of their respective travels. For a more detailed discussion of the piggyback arrangement of the chain links, reference is made to the aforementioned, commonly assigned U.S. Pat. No. 3,583,550, the entire disclosure of which is fully incorporated herein by reference.

Figure 5:
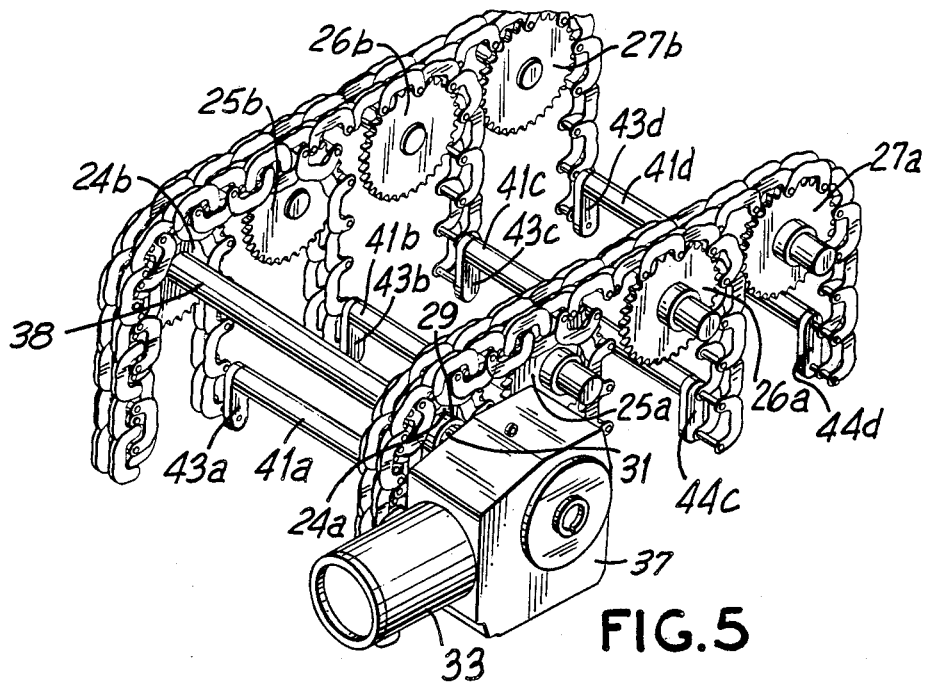
FIG. 5 is a partial perspective view illustrating two chain sets which work together according to the present invention.
Figure 6:
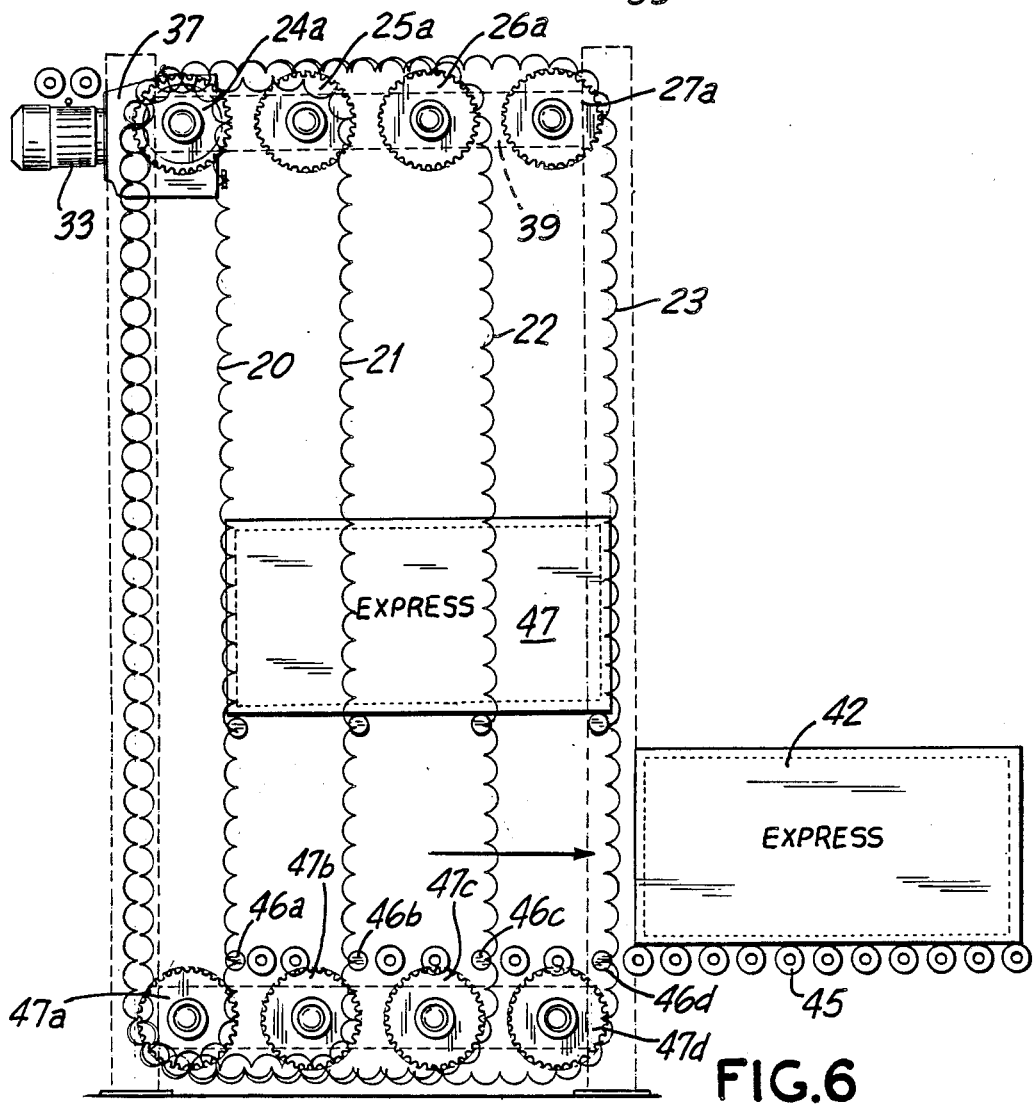
FIG. 6 is a side elevational view illustrating one use of the drive chain system shown in FIG. 5.

Referring now to FIGS. 5 and 6, there are shown two sprockets assemblies; one assembly consisting of the sprockets 24a, 25a, 26a and 27a, and the other assembly consisting of the sprockets 24b, 25b, 26b and 27b. The sprockets 24a and 24b are connected by shaft 38 which is rotatably driven by the output shaft 29 which is connected to the drive shaft 31. The output shaft 29 is driven by the motor 33 within the gear box 37. The sprockets 25a, 25b, 26a, 26b, and 27a, 27b rotate in the frame 39.

The freely rotating rollers 41a, 41b, 41c and 41d are used to support the load 42 during its transport. Each of the support rollers 41a, 41b, 41c and 41d are fixed at their respective ends to the support plates 43a–44a, 43c–44c and 43d–44d, through the respective pin members of the link plates.

In FIG. 6, the load 42 is shown stationed on the roller conveyor 45 ready to be loaded on the next set of support rollers 46a, 46b, 46c and 46d for transport by the chain drive system of the present invention. The bottoms of the chains are trained over freely rotatable (not driven) sprockets 47a, 47b, 47c and 47d which are rotatably mounted in the frame 39. A second set of freely-rotatable sprockets similar to the sprockets 47a–47b are disposed beneath the sprockets 24a–24b.

Figure 7:
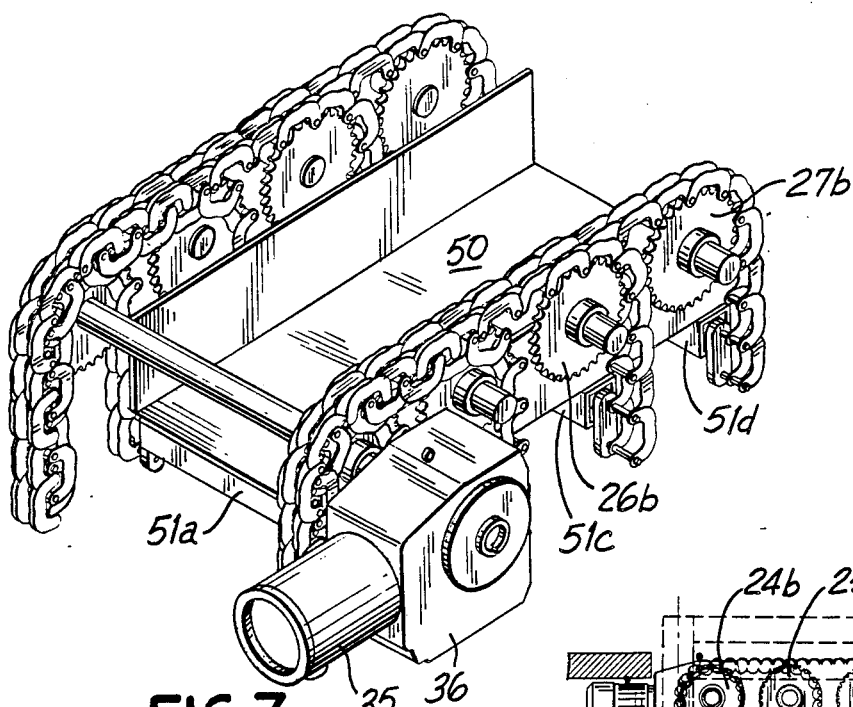
FIG. 7 is a partial perspective view, similar to FIG. 5, illustrating a platform in conjunction with the drive chain system shown in FIG. 5.

FIG. 7 is similar to FIG. 5 except that in FIG. 7 the support rollers carry a platform 50. The support rollers (not shown in FIG. 7) ride within the channels 51a, 51b, 51c and 51d formed in the platform 50 (channel 51b is not shown in FIG. 7).

Figure 8:
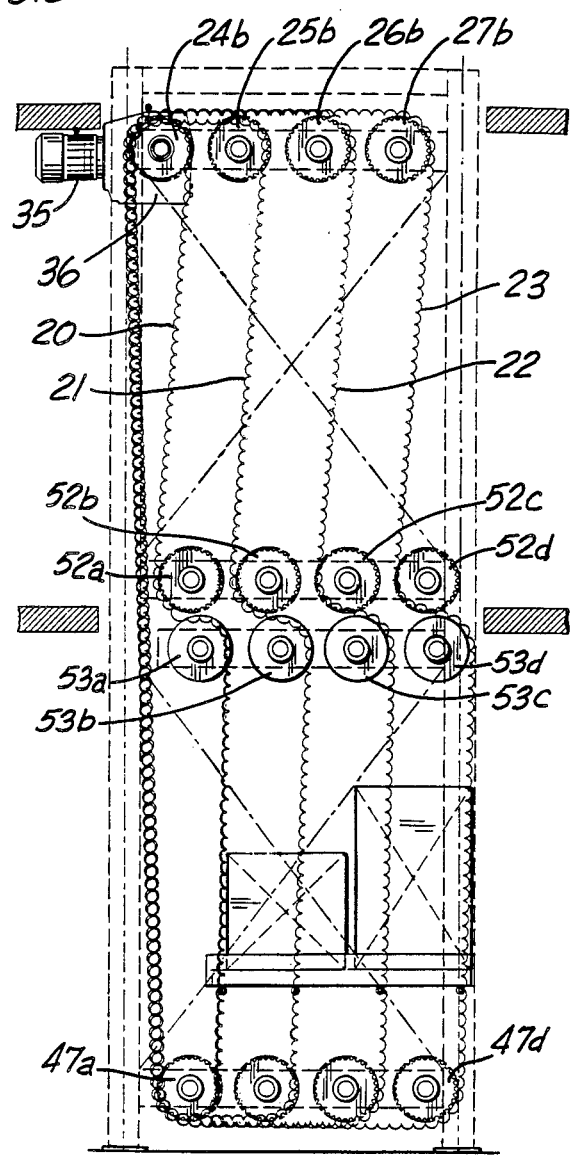
FIG. 8 is a side elevational view showing one use of the drive chain system of FIG. 7.

In FIG. 8, the chains 20, 21, 22 and 23 are looped over a first intermediate set of freely rotatable sprockets 52a, 52b, 52c and 52d, and over a second intermediate set of freely rotating sprockets 53a, 53b, 53c and 53d. There two sets of sprockets are offset relative to each other so as to permit the load to rest on the sprockets 53a, 53b, 53c and 53d when loading and unloading at intermediate floor levels such as 54. This avoids direct strain on the chains at this level.

In operation, and with reference to FIGS. 7 and 8, a load 42 is placed on the platform 50. The platform 50 is lifted by the rollers 41a–41d (see FIG. 5) which are disposed within the channels 51a–51d. The rollers 41a–41d are lifted simultaneously, and at the same speed, by the equal lifting motion of the chains 20–23. The rollers 41a–41d are connected to the chains 20–23, respectively, through the support plates 43a–43d and 44a–44d. Uniformity of lifting speed is attained because the chains 20–23 are interlocked for part of their travel. Uniformity of lifting speed insures that the platform, and hence the load, does not tilt during its travel.

The motor 33 drives the sprockets 24a, 24b, and as these sprockets rotate, their teeth mesh with the chains 20–23. The other sprockets, i.e., sprockets 25a–27a and 25b–27b are idler sprockets. Similarly, the sprockets 47a–47d (see FIGS. 6 and 7), the sprockets 52a–52d and 53a–53d (see FIG. 8) are also idler sprockets.

In order to lower the load, the direction of the motor 33 is reversed, for example, by using a reversible motor or by using the gear box 37 in order to reverse the rotation of the output shaft 29.

Other variations and modifications of the chain drive system hereinbefore described are obvious from the foregoing detailed description. Such variations and modifications are nevertheless within the scope and contemplation of the present invention.

What is claimed is:

1. A drive chain system comprising at least two-chain pairs which consist of first, second, third and fourth chains arranged in superposed interlocking relationship throughout at least a part of their travel; each of said chains comprising a succession of links having overlapping portions rotatably connected together, each of said links having opposed and spaced apart link plates, with the link plates of the fourth chain lying between and being inner as to the link plates of the third chain, and the link plates of the first chain lying between and being inner as to the link plates of the second chain, the first and third chain being piggy-backed for part of their travel, and the second and fourth chains being piggy-backed for part of their travel.

2. A drive chain system according to claim 1 wherein the link plates of each of said links are in parallel planes.

3. A drive chain system according to claim 1 wherein each of said links has a generally U-shaped configuration defined by a central portion and two opposed generally upright portions, and a coupling member for rotatably connecting said opposed upright portions.

4. A drive chain system according to claim 1 wherein said links have outer overlapping portions having notches formed therein for engaging the notched outer overlapping portions of the links of the other chain when the chains are in superposed interlocking relationship.

5. A drive chain system according to claim 1, 2, 3 or 4 further including a plurality of rotatable sprockets, including a first, second third and fourth sprockets, said first sprocket driving said first, second, third and fourth chain during their superposed interlocking relationship, said second sprocket driving only said second, third and fourth chains during their superposed interlocking relationship, said third sprocket driving only said third and fourth chains during their superposed interlocking relationship, and said fourth sprocket driving only said fourth chain.

6. A drive chain system according to claim 5 wherein each of said sprockets has a pitch equal to one-half of the distance between the overlapping portions of the successive links in each chain for engaging the links of each chain where said chains are arranged in superopposed interlocking relationship.

* * * * *